United States Patent
Schwartz

[11] 3,911,450
[45] Oct. 7, 1975

[54] FRONT PROJECTION APPARATUS

[75] Inventor: Jay Martin Schwartz, Creve Coeur, Mo.

[73] Assignee: Chromalloy Photographic Industries, Inc., St. Louis, Mo.

[22] Filed: May 20, 1974

[21] Appl. No.: 471,210

[52] U.S. Cl. ............ 354/77; 352/89; 353/28; 355/43; 355/70
[51] Int. Cl.² .......... G03B 29/00; G03B 21/26; A63J 5/00
[58] Field of Search .......... 353/28; 354/77; 355/43, 355/46, 60, 63, 71, 70; 352/89

[56] References Cited
UNITED STATES PATENTS

| | | | |
|---|---|---|---|
| 2,854,901 | 10/1958 | Fathauer | 354/77 X |
| 3,059,525 | 10/1962 | Shuftan | 355/43 X |
| 3,060,796 | 10/1962 | Muse, Jr. | 355/71 |
| 3,227,509 | 1/1966 | Baker | 353/28 X |
| 3,322,487 | 5/1967 | Renner | 355/43 X |
| 3,350,980 | 11/1967 | Margolin | 353/28 X |
| 3,376,800 | 4/1968 | Faasch | 354/77 |
| 3,459,888 | 8/1969 | Sokolov | 355/46 X |
| 3,645,620 | 2/1972 | Jaffe | 355/63 |
| 3,796,487 | 3/1974 | Voorhees | 354/77 X |

Primary Examiner—Richard A. Wintercorn

[57] ABSTRACT

For portrait studio use with motorized, electrically operated flash cameras, a front projection apparatus provides a selection of background slides which may be pre-viewed. In taking the picture, chance misalignment of the selected slide is prevented, and the background selected is projected at high intensity. A slide box is transported in a tunnel parallel to the horizontal axis of the projector. A slide injector moves a slide laterally from the tunnel to the optical axis; when in proper position, circuit is made permitting operation of the camera shutter and magazine. Optimum intensity of the projected background is obtained, without a separate reflector for the flash, by positioning the flash tube immediately in front of a pre-viewing lamp having an integral bowl-type reflector.

2 Claims, 5 Drawing Figures

FRONT PROJECTION APPARATUS

BACKGROUND OF THE INVENTION

This invention relates to front projection apparatus, of the type normally positioned beneath a still camera, with its projection components including a slide holder aligned on a normally horizontal axis leading to a 45° front surface mirror. The mirror directs the image upward through a projection lens to a 45° semi-reflecting mirror or beam splitter immediately forward of the lens of the still camera, arranged so that the axis of projection will coincide with the optical axis of the camera.

Such apparatus has not heretofore been well-suited for use in commercial portrait studios. The camera equipment customarily used in such studios incorporates electrically operated shutters correlated with actuation of a flash tube, and an electrically-advanced film magazine. Long-roll films are sent, after exposure, to specialized film processors for continuous development and printing of every exposure, automatically making a number of enlargements. These expensive operations will necessarily be applied to any and all chance mis-exposures, even if such mis-exposures were detected and new exposures made.

Front projection apparatus has also been bulky, with relatively high power required to project color slides with enough intensity to provide vivid naturalness. This problem is complicated by the fact that while the light from its flash tube must be concentrated by some reflector, its optical system must also include a pre-viewing lamp, to project the backgrounds as they are being viewed prior to making selection among them. In some such apparatus, either the pre-viewing lamp or the flash tube has therefore been displaced from the optical axis.

SUMMARY OF THE INVENTION

The purposes of the present invention include providing a compact front projection apparatus of such optical efficiency as to flash the backgrounds vividly with a lower power requirement. A still further purpose is to provide an apparatus which permits the easy change of background slides, allowing the person whose portrait is being taken to be seen in a number of settings from which choice can be made; and to provide a positive lockout to prevent operating the camera when the selected background slide has not been aligned with the optical axis of the apparatus.

Generally summarizing the present invention, without limiting its scope, the present front projection apparatus includes a tunnel through which a slide box may be moved, so that its slides may be selectively brought to the projection station. A slot in the outer wall of the tunnel has a projecting handle which grasps the slide box for forward and aft positioning. Lateral transport means then moves the selected slide from the tunnel laterally inward to the projection position on the optical axis.

During forward and aft movement of the slide box, a switch in the camera circuitry is open, and remains so until the lateral transport centers a slide precisely on the optical axis. As this position is attained, the switch is closed to permit the photographer to operate the camera shutter and simultaneously make a circuit to the flash tube; otherwise neither the shutter nor the motorized film magazine can be actuated.

For pre-viewing the background slides to make a selection among them, a pre-viewing lamp is included in the projector. I utilize that type which has its own integral sealed bowl-type reflector. This is positioned centrally and directly on the optical axis, with the flash tube mounted immediately forward of it. No other reflector for the flash tube is used. While taking the picture, the pre-viewing lamp is not in circuit; but its reflector nevertheless serves to reflect and concentrate the light from the flash with exceptional efficiency.

DESCRIPTION OF THE PREFERRED EMBODIMENT

Figure 1:
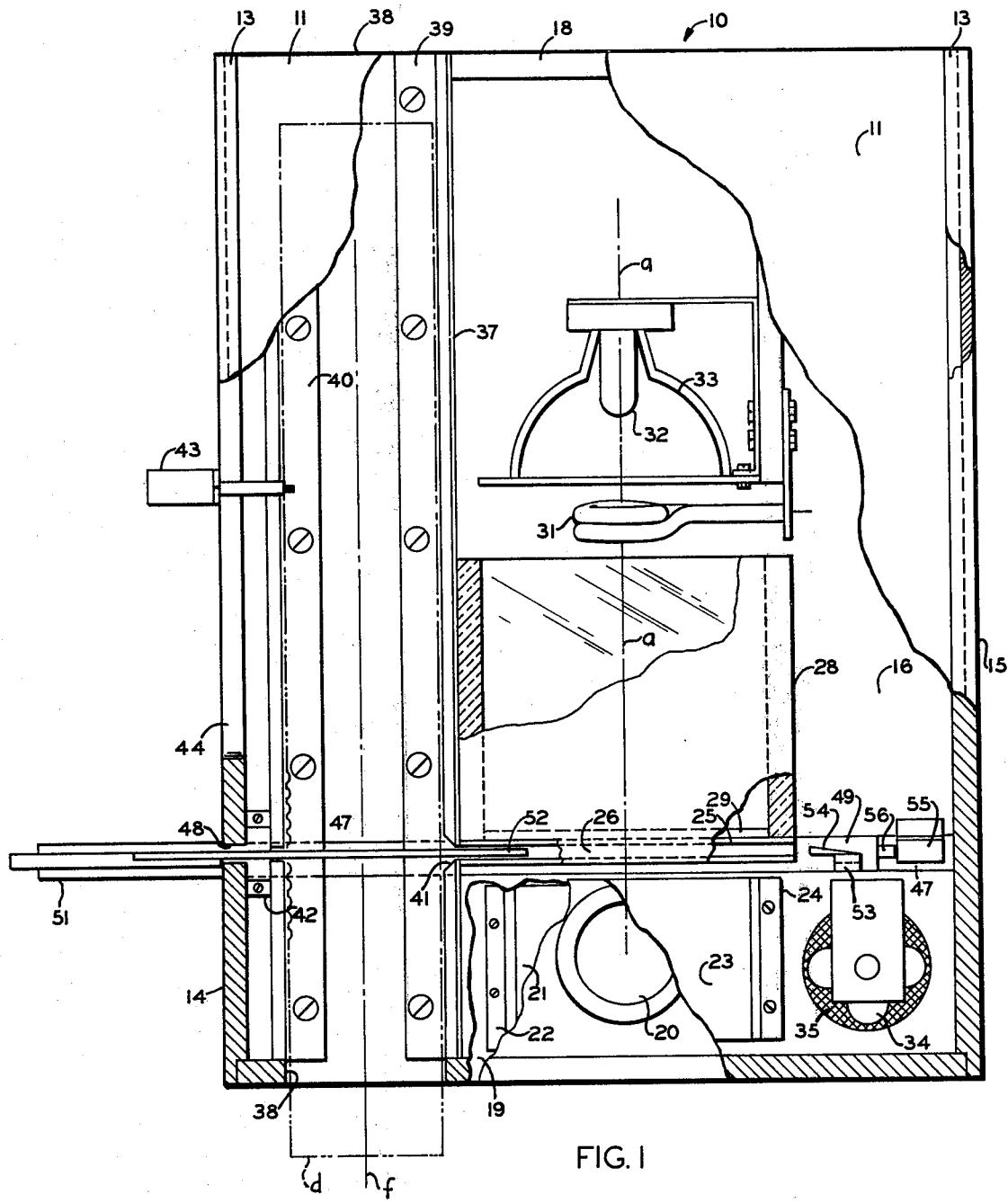
FIG. 1 is a plan view of the present invention with upper portions thereof successively broken away to show the arrangement of the component parts.

A preferred embodiment of the presentation is shown in the drawings, somewhat simplified for clarity of illustration. In the plan view FIG. 1, upper portions are successively broken away to show the arrangement of interior components of a projector case generally designated 10. Its flat top wall 11, to be equipped with a sliding fore-and-aft sliding camera mount plate not shown, has for this purpose along its left and right sides a pair of channels 13, erected above the left and right side walls 14, 15 of the case 10. The projector has a bottom wall 16 hereinafter referred to, together with front and rear walls 17, 18. Its interior optical components are disposed generally along an optical axis $a$.

Figure 2:
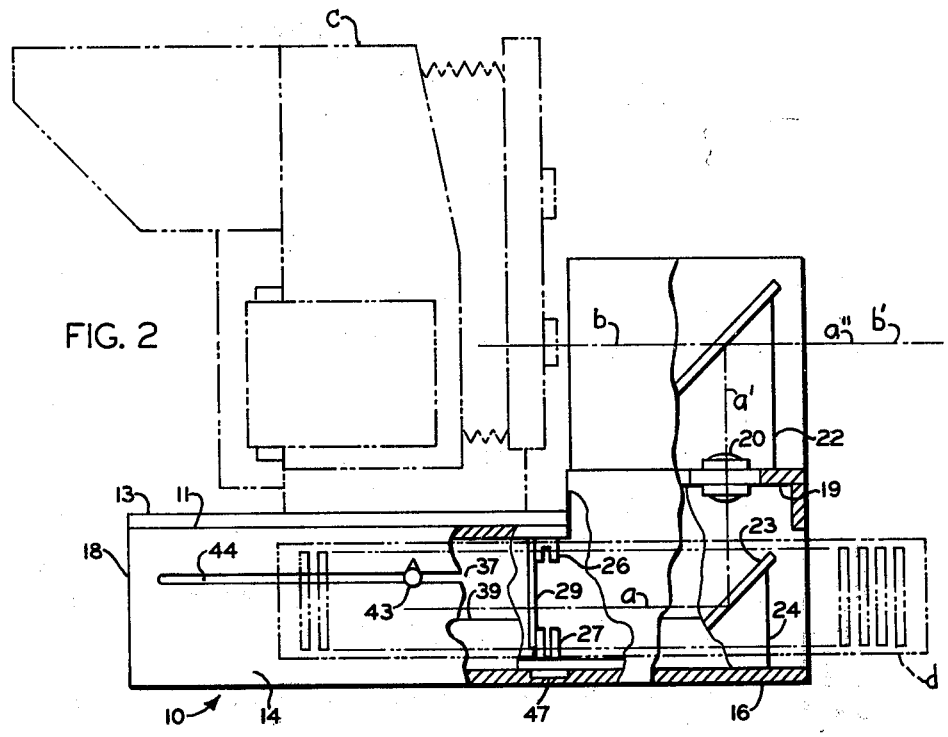
FIG. 2 is a left side elevation thereof, with the slide injector removed and, partly schematic and broken away, showing in phantom a camera mounted thereon and a slide box therein.
Figure 3:
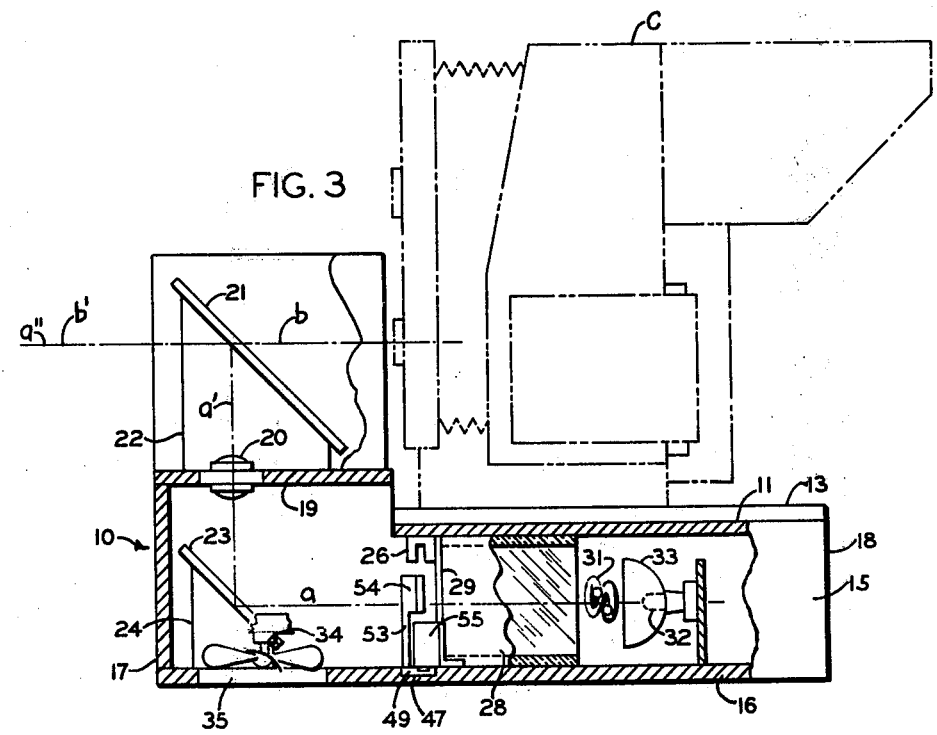
FIG. 3 is a right side view partly schematic and broken away.

Mounted in a raised forward portion 19 of the top wall 11 is an upwardfacing projection lens 20. The image projected by this lens along an axis $a'$ impinges on the front surface coating of a conventional, partially reflective mirror or beam splitter 21, held by sheet metal brackets 22 at a 45° angle, as seen in FIGS. 2 and 3. Thus the image projected through the lens 20 will be reflected forward by the beam splitter 21 along a common axis $a''b'$ coincident with the picture taking axis $b$ of the camera $c$ shown in phantom lines. The photographer may prefer to slide the camera $c$, on its mounting plate in the channels 13, to a somewhat more forward position, so that its lens is at substantially the same distance as the projector lens 20 from the intersection on the beam splitter 21 of the axes $a'$ and $b$.

Arranged along the projector optical axis $a$, which is normally horizontal when the camera $c$ is positioned horizontally, are all optical components within the projection apparatus except the lens 20 in its upper wall 19. These components include a front surface mirror 23, positioned by brackets 24 at a 45° angle beneath the lens 20, a slide positioner frame assembly having upper and lower facing grooved parts, 26, 27, a square internally mirrored light gathering box 28 whose aft side is open and whose forward side mounts a diffusing glass sheet 29, a flash tube 31 and a pre-viewing or modeling lamp 32.

The flash tube 31 chosen for the preferred embodiment is a 200 watt second tube of the type including its own gas ionizing coil and fired by a trigger coil 61, hereinafter referred to. The pre-viewing lamp 32 is mounted directly behind the flash tube 31 on the optical axis $a$. The chosen pre-viewing lamp 32 is a commercially available 120 volt 300 watt quartz bulb having an integral bowl-shaped 1¾ inch diameter dichroic reflector 33; this type is ordinarily used as a continuous projection lamp. In the present invention it is not used for picture taking but only intermittently, for sampling and selection of backgrounds.

Contrary to usual practice, no reflector is provided for the flash tube 31 other than the integral reflector 33 of the pre-viewing lamp 32. The proximity of the tube 31 to the lamp 32 and to the internally mirrored box 28 serves nevertheless to provide exceptionally effective gathering of the light from the flash tube 31 and its projection through the diffusing sheet 29. The color correction afforded by the dichroic reflector 33 projects the light from the flash tube 31 with accurate color balance as well as vividness. Doing away with an extra reflector for the flash tube 31 permits both the flash tube 31 and the lamp 32 to be positioned precisely on the optical axis $a$.

To carry away the heat of the flash tube 31 and pre-viewing lamp 32, an electric fan 34 is provided in a screened opening 35 in the bottom wall 16 of the projector case 10.

Figure 4:
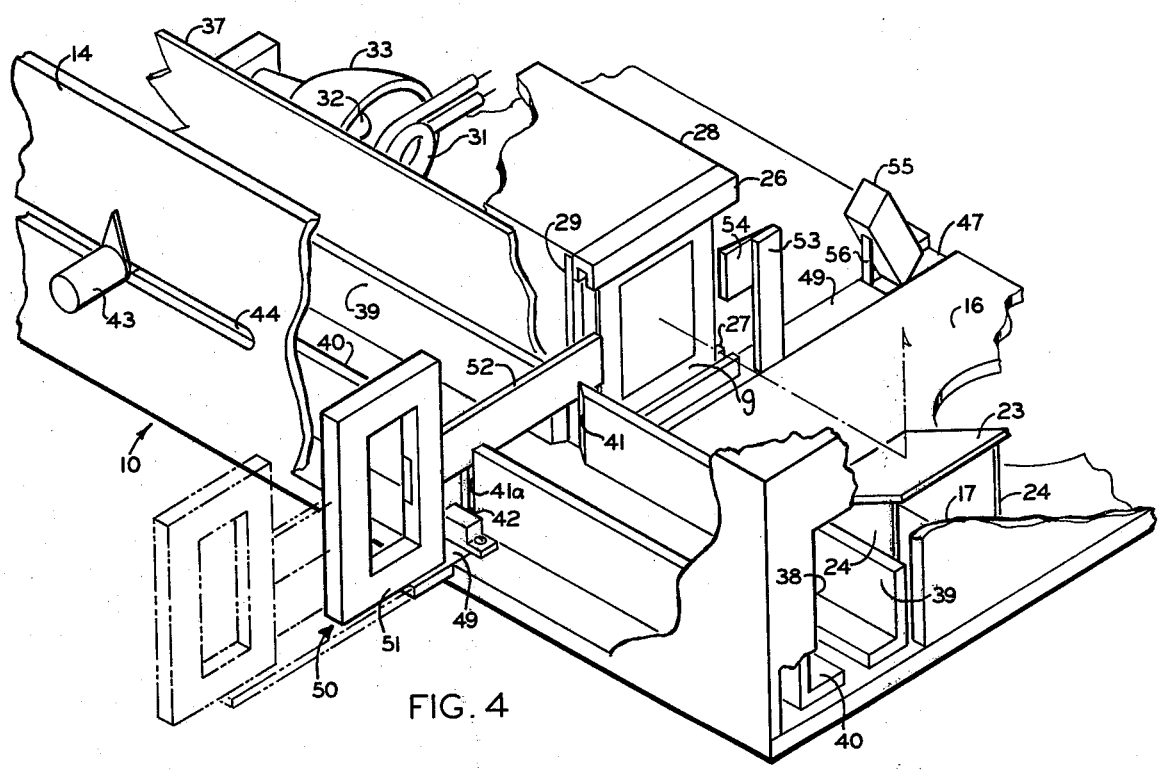
FIG. 4 is an enlarged fragmentary perspective view showing the arrangement of interior components.

One of the purposes of the present apparatus is to permit the easy viewing of the person to be photographed with a succession of possible backgrounds, one of which is to be selected for taking the picture. Referring to FIGS. 1, 2 and 4, the projection apparatus has, parallel to and inwardly of the left side wall 14, an interior partition 37, which, aided by the top and bottom walls 11, 16 serves as a tunnel in which a conventional box or tray $d$ for glass-bound projection slides is accommodated. As best seen in FIG. 4, this permits movement on an axis $f$ parallel to the optical axis $a$, through end openings 38 which mark the tunnel openings in the front and rear wall 17, 18. Slide channels 39, 40 serve as guides for such a slide box $d$ as it is moved back and forth along the axis $f$ preliminarily to selecting and viewing a particular slide. The channels 39, 40 are interrupted by vertical slots 41, 41$a$ laterally adjacent to the grooved slide positioners 26, 27 which hold a slide when transferred to the projector optical axis $a$. Assuming the box $d$ has conventional serrations marking the position of each slide, a lateral spring-urged detent 42 engages such serrations to assure alignment of a slide to be selected with the grooves of the slide positioners 26, 27. A slide selector rod 43, having an external knob and an inner threaded end attachable to the slide box $d$, extends through a horizontal slot 44 in the left side wall 14. The knob portion of the selector rod 43 may incorporate a pointed indicator, as shown, to read against a slide designation legend tab, not shown, which may be mounted on the left side wall 14.

Extending across the bottom wall 16 beneath and slightly forward of the lower grooved slide positioner 27 is a lateral slide-injector guide groove 47. It is aligned with a vertical slot 48 in the left wall 14 of the projector case 10. In the groove 47 slides the elongated base arm 49 of a slide injector generally designated 50, best seen in FIG. 4. It includes, in addition to the base arm 49, a handle portion 51 located outwardly of the left side wall 14, with blade-like slide pusher 52 which projects through the slot 48 in the case left wall 14 and may push through the slots of the slide box $d$, to push one of the projection slides $g$ from the box $d$ onto the grooved slide holders 26, 27 and into position along the optical axis $a$. A return standard 53 extends vertically upward from the front edge of the base arm 49, so that it may pass in front of the lower slide holder 27. At the upper end of the return standard 53 is an aft-projecting return blade 54. On the return stroke of the injector 50, this return blade 54 is brought against the slide $g$ and causes it to return outward to the tapered groove 41 of the channel 39. Thereafter, either forward or aft movement of the slide box $d$ will cam the slide $g$ the rest of the way into it.

Mounted at the right end of the injector guide groove 47, for actuation by the base arm 49 when the slide $g$ is injected fully inward laterally to its position on the optical axis $a$, is a microswitch 55 whose operating arm 56 is engaged by the end of the injector base arm 49. Closing the switch 55 makes possible an electrical circuit to the camera $d$, as hereafter described.

Figure 5:
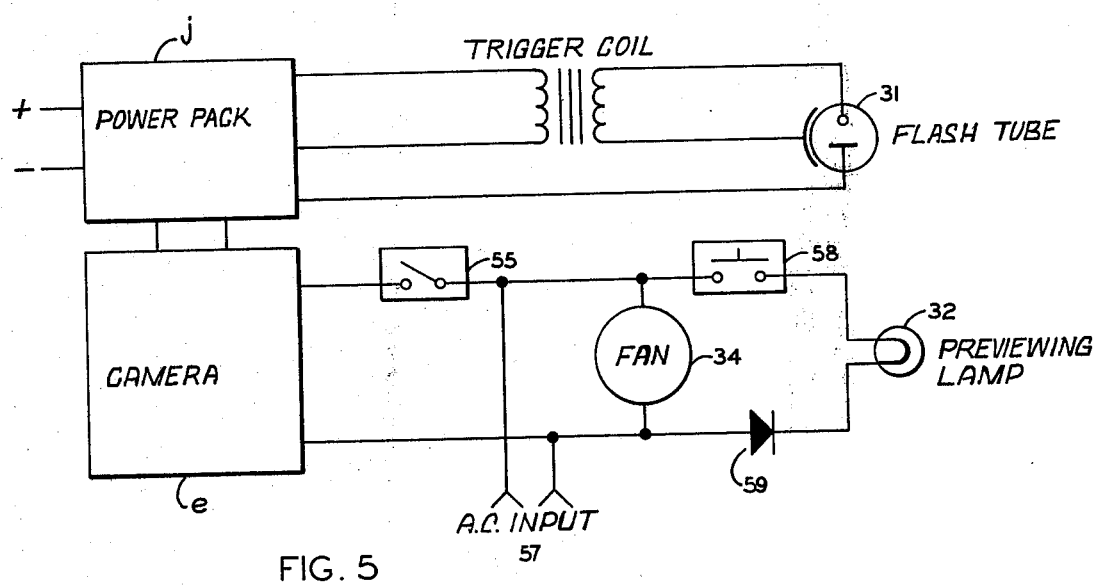
FIG. 5 is a simplified wiring diagram showing the electrical connections between the present apparatus and a conventional motorized camera and power pack.

The wiring diagram FIG. 5 omits certain conventional elements such as indicator lamps, plugs and receptacles. The camera $c$, of the conventional type used in commercial portrait studios and including an electrically operated shutter and motorized film magazine, is actuated by a conventional power pack $j$, which also supplies the power for the flash tube 31 as will be described. The circuitry within the projector case 10 provides an a.c. power input plug 57 for constant operation of the ventilating fan 34; also, when a momentary contact switch 58 is closed, circuit is made to the pre-viewing lamp 32 through a series connection with a power-limiting diode 59. This greatly increases the life of the pre-viewing lamp 32 while it provides adequate light for pre-viewing the projection slide $g$.

When but only when the normally open microswitch 55 is closed by the right end of the injector base arm 49, as shown in FIG. 4, circuit is made to supply power to the shutter of the camera $c$ and to its motorized film magazine.

Through conventional connections to the power pack $j$, actuation of the shutter of the camera $c$ will be accompanied by actuation of conventional studio lights. Simultaneously the flash tube 31 within the projector will be flashed through a trigger coil 61. This is a conventional transformer-like device which provides high voltage to the ionizing coil which ionizes the gas between the anode and cathode of the flash tube 31, making it conductive and hence flashing the tube.

With the present invention, it is found that the light produced by a 200 watt second flash tube is sufficient, using no reflector other than the integral reflector 33 of the pre-viewing lamp 32 immediately behind it on the same optical axis, and aided by the mirrored light-gathering box 28. Color slides projected with the present apparatus by this arrangement of components appear with such vividness as to be actual backgrounds. In this respect the apparatus compares favorably with other front projection apparatus using roughly 4 times as much power.

Coordination of the microswitch 55 with the slide injector 50 affords safety which permits the pre-viewing of the subject with a large number of backgrounds; it assures that despite the insertion and removal of a number of slides, the camera will not be operated unless a chosen slide g is located precisely on the axis a. Were it not for this precaution, the occasional chance mis-exposures would have to go through the entire commercial and finishing operations, as when long-roll films are automatically processed at remote commercial plants. Accordingly, the present apparatus provides a positive lock-out which permits extensive viewing of a number of backgrounds and selection of a desired one without danger of mis-exposure; and at the same time provides a compact apparatus, having a low power requirement, which, without a separate reflector for the flash tube, projects backgrounds with exceptional optical efficiency.

While the preferred embodiment has been illustrated and described somewhat schematically, from this disclosure persons skilled in the art will be enabled to make adaptations and modifications within the teachings hereof.

I claim:

1. For use with that type of still camera which utilizes an electrically operated shutter, front projection apparatus having conventional projection components, certain of said components being mounted within a walled enclosure along a normally horizontal optical axis, the components so mounted including a flash tube for background projection during picture taking and means to provide forwardly thereof projection slide positioner means, said apparatus further including forwardly of the projection slide positioner means, conventional means to bend the optical axis first to a 45° beam splitter forwardly of such camera and thence into coincidence with the optical axis of such camera, and electrical means to operate said flash tube and the shutter of such camera synchronously, said front projection apparatus being characterized in having a tunnel within said walled enclosure laterally outward of and having a tunnel axis extending parallel to said optical axis, means to move and position along said tunnel axis a holder of slides maintained by the tunnel parallel to its axis, whereby a selected slide may be positioned and aligned laterally adjacent to said projection slide positioner means, means to transport such slide from the tunnel axis to a laterally inward position coincident with said projection slide positioner means on said optical axis, and switch means, responsive to said slide transport means, to permit such synchronized operation only when said slide transport means is in said laterally inward position.

2. For use with that type of still camera which utilizes an electrically operated shutter, front projection apparatus having conventional projection components, certain of said components being mounted within a walled enclosure along a normally horizontal optical axis, the components so mounted including a flash tube for background projection during picture taking and means to provide forwardly thereof projection slide positioner means, said apparatus further including forwardly of the projection slide positioner means, conventional means to bend the optical axis first to a 45° beam splitter forwardly of such camera and thence into coincidence with the optical axis of such camera, and electrical means to operate said flash tube and the shutter of such camera synchronously, said front projection apparatus being characterized in having a tunnel within said walled enclosure laterally outward of and having a tunnel axis extending parallel to said optical axis, a slot through said tunnel wall to the exterior of said enclosure, means extending outward through said slot to move and position along said tunnel axis a holder of slides maintained by the tunnel parallel to its axis, whereby a selected slide may be positioned and aligned laterally adjacent to said projection slide positioner means, a slide position indicator mounted on said outward extending means adjacent to the outer surface of said wall, whereby reading the position indicator against the wall indicates which slide is in position aligned with the projection slide positioner means, and means to transport such slide from such aligned position to a laterally inward position coincident with said projection slide positioner means on said optical axis.

* * * * *